(12) United States Patent
Yoshikawa et al.

(10) Patent No.: US 7,276,680 B2
(45) Date of Patent: Oct. 2, 2007

(54) CONTROL UNIT AND OPTICAL DISK DRIVE INCLUDING THE CONTROL UNIT

(75) Inventors: Akira Yoshikawa, Nara (JP); Katsuya Watanabe, Nara (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 10/596,108

(22) PCT Filed: Nov. 25, 2004

(86) PCT No.: PCT/JP2004/017469

§ 371 (c)(1),
(2), (4) Date: May 31, 2006

(87) PCT Pub. No.: WO2005/055213

PCT Pub. Date: Jun. 16, 2005

(65) Prior Publication Data

US 2007/0040093 A1 Feb. 22, 2007

(30) Foreign Application Priority Data

Dec. 1, 2003 (JP) .............................. 2003-401251

(51) Int. Cl.
*G02B 27/40* (2006.01)
*G11B 7/00* (2006.01)
(52) U.S. Cl. .............................. 250/201.5; 369/44.25; 369/44.27
(58) Field of Classification Search ............. 250/201.2, 250/201.4, 201.5; 369/44.14, 44.23, 44.25, 369/44.27, 44.29, 44.35
See application file for complete search history.

(56) References Cited

U.S. PATENT DOCUMENTS 5,060,215 A * 10/1991 Kawamura et al. ...... 369/44.35
5,286,965 A 2/1994 Okada

FOREIGN PATENT DOCUMENTS

| JP | 60-129934 | 9/1985 |
|---|---|---|
| JP | 62-138315 | 9/1987 |
| JP | 2-42214 | 3/1990 |
| JP | 02-162531 | 6/1990 |
| JP | 04-141830 | 5/1992 |

OTHER PUBLICATIONS

International Search Report for corresponding Application No. PCT/JP2004/017469 mailed Jan. 25, 2005.
Fom PCT/ISA/237 and concise explanation, 2005.

* cited by examiner

*Primary Examiner*—Kevin Pyo
(74) *Attorney, Agent, or Firm*—Renner, Otto, Boisselle & Sklar, LLP

(57) ABSTRACT

An information processing apparatus includes: a converging section for converging light; a shifting section for shifting the focus of the light by moving the converging section perpendicularly to an information storage layer of a storage medium responsive to a drive signal; a position control section for generating a position control signal to move the converging section at variable velocities; a focus control section for generating a focus control signal based on a light amount signal representing reflected light such that the focus is located in a focus controllable range; a switching section for selectively outputting the position control or focus control signal; and a driving section for outputting a drive signal responsive to the output signal.

9 Claims, 6 Drawing Sheets

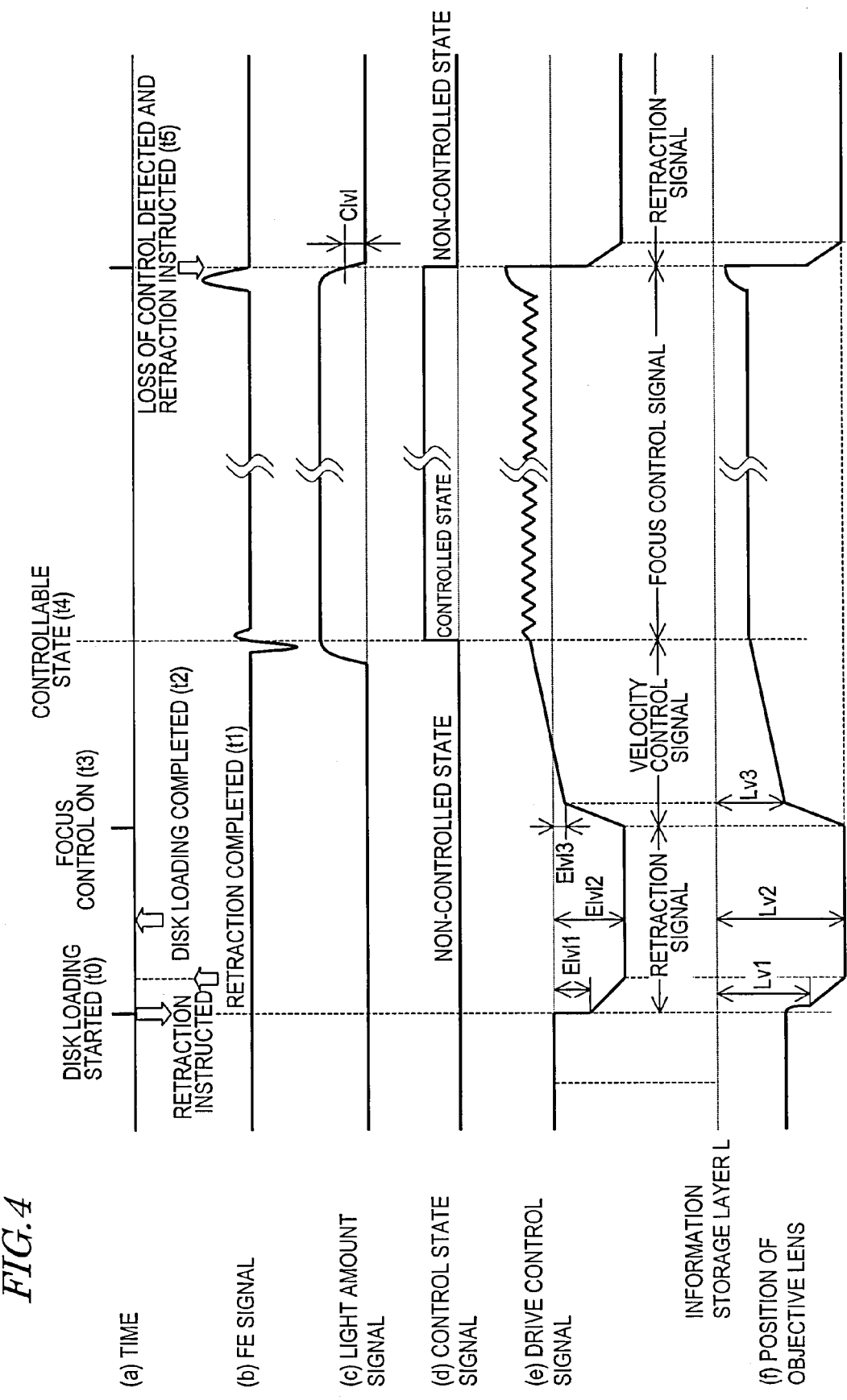

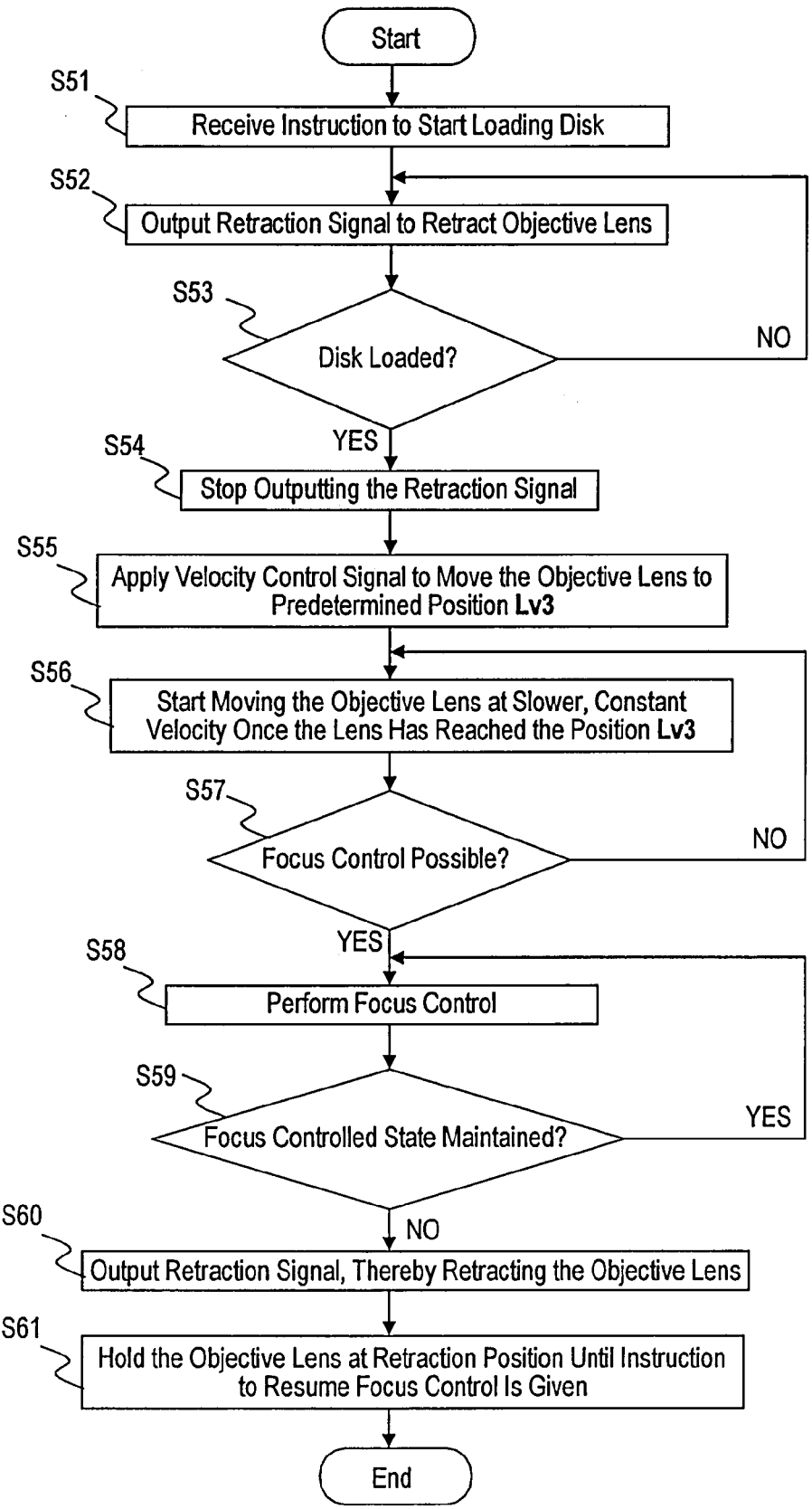

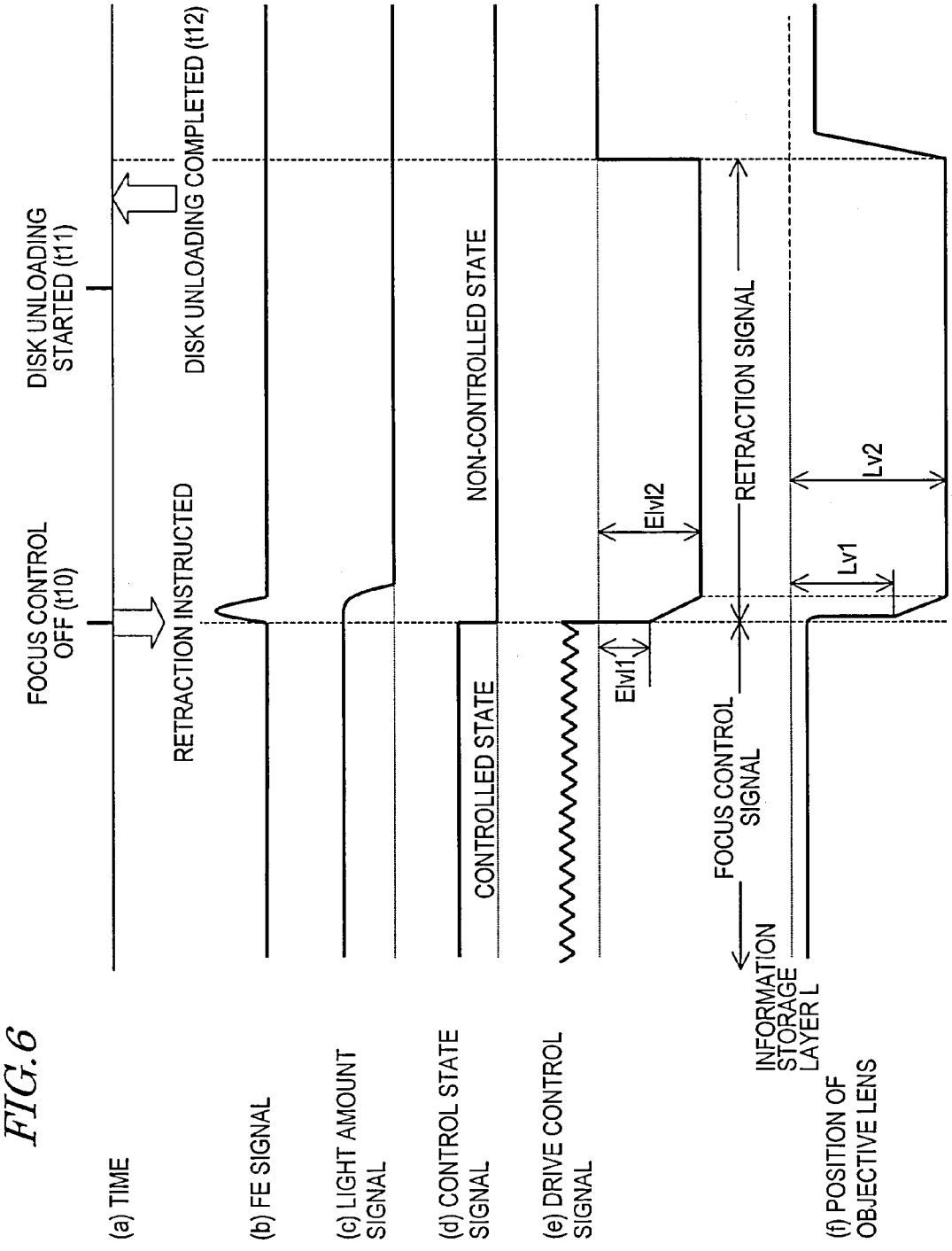

CONTROL UNIT AND OPTICAL DISK DRIVE INCLUDING THE CONTROL UNIT

TECHNICAL FIELD

The present invention relates to a technique of controlling a device for reading and/or writing data from/on a storage medium such as an optical disk.

BACKGROUND ART

To read and/or write data from/on a disk such as a DVD by using light that has been emitted from a laser diode or any other light source, the operation of a disk drive needs to be controlled such that the point of convergence (i.e., the focal point) of the light is always located right on the information storage layer of the disk. This type of control is called a "focus control". To realize the focus control, an objective lens in an optical pickup is arranged near the disk.

However, since the objective lens is located close to the disk, the objective lens might contact with, or collide against, the disk loaded or a member of the disk drive while no focus control is being performed.

Thus, a technique of avoiding such a collision is needed. For example, Patent Document No. 1 discloses a technique of avoiding a collision between an objective lens and the cartridge of a disk being inserted into, or removed from, a disk drive. Hereinafter, it will be described with reference to FIGS. 1 and 2 how such a conventional disk drive works for that purpose.

FIG. 1 shows a configuration for a conventional disk drive 100. A disk 101 is stored in a cartridge 102 and has an information storage layer L. An optical pickup 103 includes an objective lens 123 and an actuator 122 for driving the objective lens 123 and detects the light that has been reflected from the information storage layer L of the disk 101. A focus error signal generating circuit 112 generates a focus error signal, representing how much the focal point of the light has shifted from the information storage layer L, based on the output of the optical pickup 103. In response to the output of the focus error signal generating circuit 112, a focus control circuit 120 outputs a focus control signal to get the focal point located right on the information storage layer L. An actuator driver circuit 121 drives the actuator 122 responsive to a drive control signal e, thereby moving the objective lens 123 perpendicularly to the information storage layer L.

An energizing signal generator 135 outputs a signal that moves the objective lens away from the disk 101 by energizing the actuator 122. In accordance with an instruction given by a system controller 130, a switching circuit 131 switches the output of the focus control circuit 120 into that of the energizing signal generator 135, or vice versa, and supplies the selected output signal to the actuator driver circuit 121. The output of a sensor that senses the insertion of the disk 101 and the output of an eject button for removing the disk 101 are connected to the system controller 130.

FIG. 2 shows the waveforms of internal signals in the conventional disk drive 100 to get a lens retracting operation done.

When the sensor (not shown) senses the insertion of the disk 101 that has been stored in the cartridge 102 but has just started being loaded, the system controller 130 instructs the switching circuit 131 to pass the output of the energizing signal generator 135 to the actuator driver circuit 121. When current begins to flow through the actuator 122, the objective lens 123 moves away from the disk 101. If the disk 101 starts being loaded in such a state, then the objective lens 123 will not collide against the cartridge 102 and the disk 101 can be loaded safely. Thereafter, when the switching circuit 131 shuts off the output of the energizing signal generator 135, the actuator 122 goes back to its original position.

Similar operations are carried out when the disk is unloaded. Specifically, when the eject button (not shown) is pressed, the system controller 130 receives its output. Then, the system controller 130 instructs the switching circuit 131 to pass the output of the energizing signal generator 135 to the actuator driver circuit 121. When current begins to flow through the actuator 122, the objective lens 123 moves away from the disk 101. If the disk 101 starts being unloaded in such a state, then the objective lens 123 will not collide against the cartridge 102 and the disk 101 can be unloaded safely. Thereafter, when the switching circuit 131 shuts off the output of the energizing signal generator 135, the actuator 122 goes back to its initial position.

Patent Document No. 1: Japanese Patent Application Laid-Open Publication No. 4-141830 (see page 1 and FIG. 1, in particular)

DISCLOSURE OF INVENTION

Problems to be Solved by the Invention

According to the conventional control technique described above, collision between the objective lens and the cartridge can be avoided while the disk is being loaded or unloaded. However, the conventional method does not take into consideration how collision between the objective lens and a member of the disk drive can be avoided.

On top of that, even after the disk has been loaded (e.g., while read and/or write operation(s) are/is being performed), the objective lens is still located close to the disk. That is why it is still necessary to consider how the collision between the objective lens and the disk can be avoided. For example, as for a disk that has as high storage capacity as a Blu-ray Disc, the working distance (WD) between the disk and the objective lens is even shorter than that of a conventional CD. Besides, since the disk flutters significantly, the working distance may decrease locally due to the rotation of the disk. In that case, the objective lens is even more likely to collide against the disk. Thus, some technique of avoiding such a collision needs to be developed. Among other things, a portable disk drive, which is subject to strong vibrations and impacts coming from various directions, particularly needs that technique. This is because if the actuator shifted toward the disk due to vibrations and other factors, collision between the objective lens and the disk would occur easily.

Means for Solving the Problems

An object of the present invention is to avoid such a collision between the disk and the objective lens appropriately. Other objects of the present invention are to avoid collision between the objective lens and a member of a disk drive, too, to get the disk loading and unloading operations done quickly and to establish a focus controlled state swiftly.

An information processing apparatus according to the present invention includes: a light source; a converging section for converging light that has been emitted from the light source; a shifting section for shifting the focal point of the light by changing the positions of the converging section perpendicularly to an information storage layer of a storage medium in accordance with a drive signal; a photodetecting section for receiving the light that has been reflected from the information storage layer to generate a light amount signal; a position control section for generating a position control signal to change the positions of the converging section at variable velocities depending on where the converging section is located; a focus control section for generating a focus control signal based on the light amount signal such that the focal point of the light is located within a focus controllable range with respect to the information storage layer; a switching section for selectively outputting either the position control signal or the focus control signal; and a driving section for outputting a drive signal in response to the output signal of the switching section. The switching section outputs the position control signal to shift the focal point of the light to the focus controllable range and then outputs the focus control signal.

While the storage medium is being loaded, the position control section may generate a retraction signal that changes the positions of the converging section away from the storage medium in multiple steps.

The position control section may change the positions of the converging section at a first velocity initially and then at a second velocity, which is lower than the first velocity, once the converging section has reached a first position.

While the storage medium is being loaded, the position control section may generate a position control signal that changes the positions of the converging section toward the storage medium in multiple steps.

The position control section may change the positions of the converging section at a third velocity initially and then at a fourth velocity, which is lower than the third velocity, once the converging section has reached a second position.

The focus control section may determine, by the light amount signal, whether or not the focal point of the light has entered the focus controllable range and may generate a switch instruction when the focal point enters the range. In accordance with the switch instruction, the switching section may change its output signals from the position control signal into the focus control signal.

The information processing apparatus may further include a monitoring section for determining, by the light amount signal, whether the focal point of the light is inside or outside the focus controllable range. If the monitoring section has sensed that the focal point has gone beyond the range while the switching section is outputting the focus control signal, then the position control section may generate a retraction signal that changes the positions of the converging section away from the storage medium in multiple steps.

A disk controller according to the present invention is built in a disk drive that operable to read and/or write data from/on a disk. The disk drive includes: a light source; a converging section for converging light that has been emitted from the light source; a shifting section for shifting the focal point of the light by changing the positions of the converging section perpendicularly to an information storage layer of a storage medium in accordance with a drive signal; a photodetecting section for receiving the light that has been reflected from the information storage layer to generate a light amount signal; and a driving section for outputting a drive signal in response to a drive control signal. The disk controller includes: a position control section for generating a position control signal to change the positions of the converging section at variable velocities depending on where the converging section is located; a focus control section for generating a focus control signal based on the light amount signal such that the focal point of the light is located within a focus controllable range with respect to the information storage layer; and a switching section for selectively outputting either the position control signal or the focus control signal as the drive control signal. The switching section outputs the position control signal to shift the focal point of the light to the focus controllable range and then outputs the focus control signal.

An information processing method according to the present invention includes the steps of: converging light that has been emitted from a light source using an optical system; shifting the focal point of the light by moving the converging position of the light perpendicularly to an information storage layer of a storage medium in accordance with a drive signal; receiving the light that has been reflected from the information storage layer to generate a light amount signal; generating a position control signal to change the positions of the optical system at variable velocities depending on where the optical system is located; generating a focus control signal based on the light amount signal such that the focal point of the light is located within a focus controllable range with respect to the information storage layer; selectively outputting either the position control signal or the focus control signal; and generating a drive signal based on the signal that has been output in the step of selectively outputting. The step of selectively outputting includes outputting the position control signal to shift the focal point of the light to the focus controllable range and then outputting the focus control signal.

A computer program according to the present invention is executed by the computer of a disk drive having the ability to read and/or write data from/on a disk. The disk drive in which the computer program has been installed performs the steps of: converging light that has been emitted from a light source using an optical system; shifting the focal point of the light by moving the converging position of the light perpendicularly to an information storage layer of a storage medium in accordance with a drive signal; receiving the light that has been reflected from the information storage layer to generate a light amount signal; generating a position control signal to change the positions of the optical system at variable velocities depending on where the optical system is located; generating a focus control signal based on the light amount signal such that the focal point of the light is located within a focus controllable range with respect to the information storage layer; selectively outputting either the position control signal or the focus control signal; and generating a drive signal based on the signal that has been output in the step of selectively outputting. The step of selectively outputting includes outputting the position control signal to shift the focal point of the light to the focus controllable range and then outputting the focus control signal.

Effects of the Invention

According to the present invention, a position control signal that changes the positions of a converging section at a velocity that is variable depending on where the converging section is located is output, thereby shifting the focal point of light to a focus controllable range. After that, a focus control signal that keeps the focal point of the light within the focus controllable range is output. By shifting the focal point at a velocity that varies according to the position of the converging section, the focal point can be controlled more flexibly compared to the situation where the focal point is always shifted at the same velocity. As a result, an appropriate distance can be maintained between the objective lens that determines the focal point and the disk and their collision can be avoided. Among other things, even when the NA of an optical system is increased and the working distance is decreased to realize high-density recording, the collision can also be avoided. That is why this technique can be used particularly effectively in an optical disk drive for a mobile device that is easily subject to impacts and vibrations.

BRIEF DESCRIPTION OF DRAWINGS

FIG. 4 shows how the waveforms of various signals in the disk drive 10 and the positions of the objective lens change with time after the disk 1 has been loaded.

FIG. 5 is a flowchart showing the procedure of processing to be done by the disk drive 10.

FIG. 6 shows how the waveforms of various signals in the disk drive 10 and the positions of the objective lens change with time while the disk 1 is being unloaded.

Figure 1:
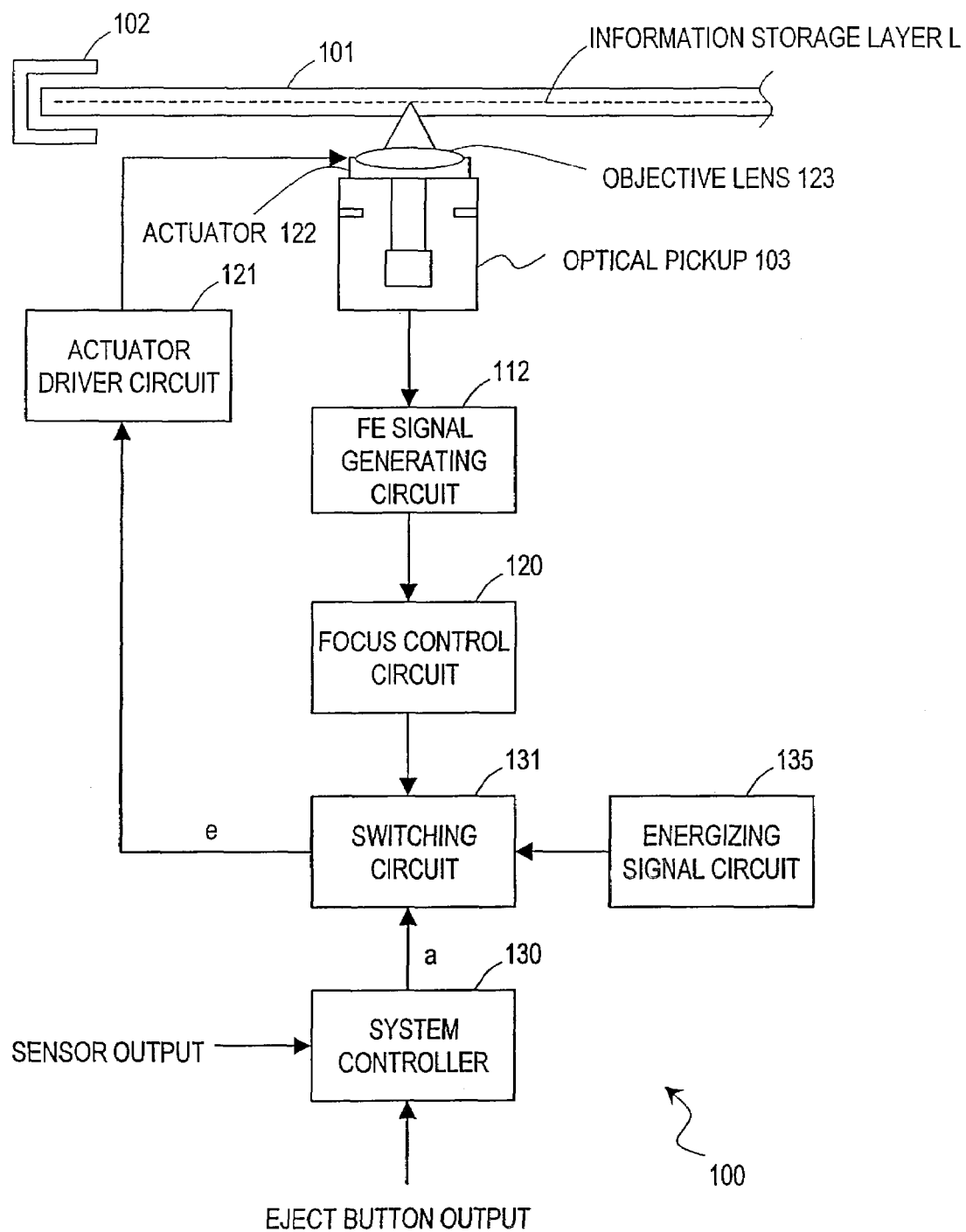
FIG. 1 shows a configuration for a conventional disk drive 100.
Figure 2:
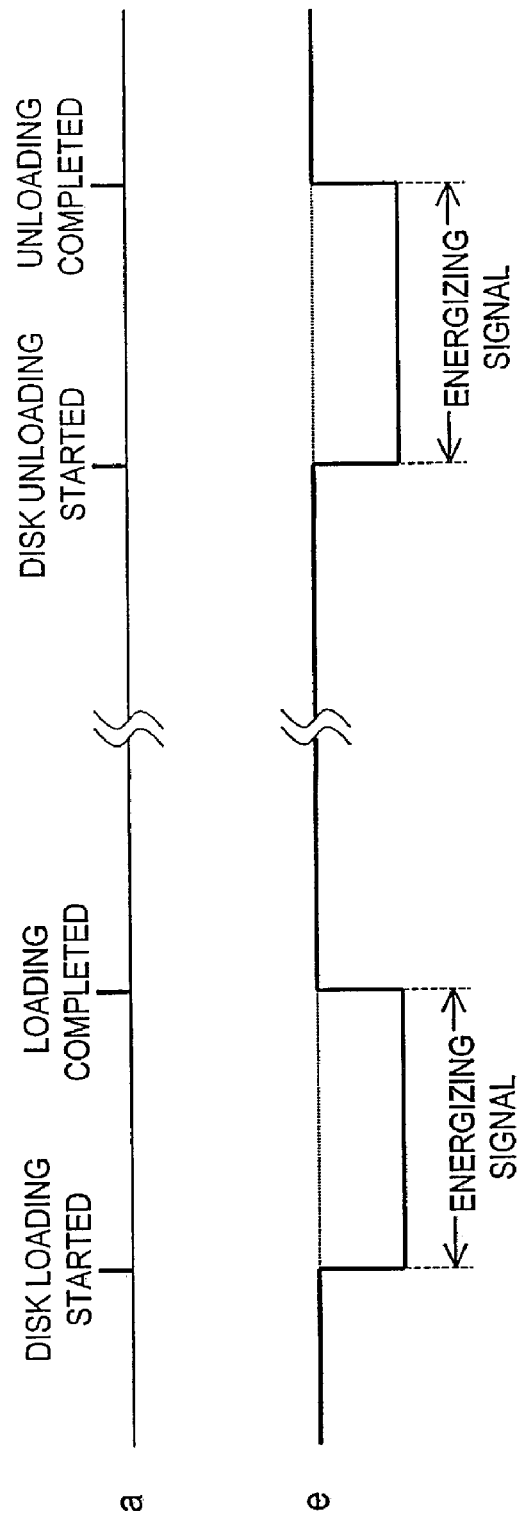
FIG. 2 shows the waveforms of internal signals to be exchanged in the conventional disk drive 100 to get a lens retracting operation done.

DESCRIPTION OF REFERENCE NUMERALS 1 disk
10 disk drive
20 optical pickup
21 laser light source
22 actuator
23 objective lens
24 photodetecting section
30 system controller
40 signal processor
41 FE signal generating circuit
42 light amount detecting circuit
50 disk controller
51 monitoring circuit
52 retraction control section
53 velocity control section
54 focus control circuit
55 switching circuit
56 position control circuit
60 driver circuit
70 playback processor circuit

BEST MODE FOR CARRYING OUT THE INVENTION

Figure 3:
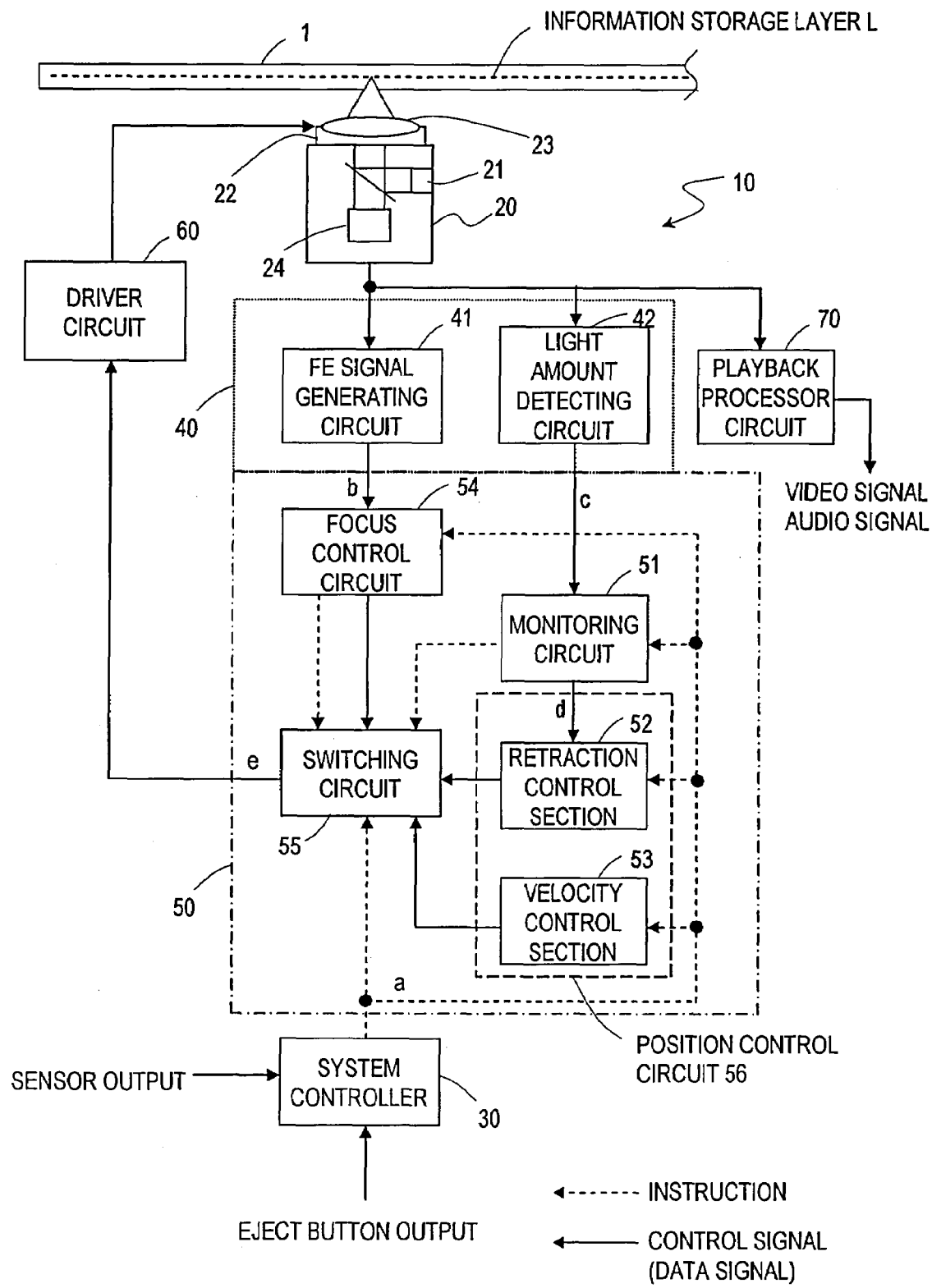
FIG. 3 shows an arrangement of functional blocks in a disk drive 10 according to a preferred embodiment of the present invention.

Hereinafter, preferred embodiments of an information processing apparatus according to the present invention will be described with reference to the accompanying drawings. In the following illustrative embodiments, the information processing apparatus is supposed to be a disk drive for reading data from a Blu-ray Disc (which will be simply referred to herein as a "disk 1") and outputting a video signal, an audio signal and so on. The disk 1 is a disklike optical information storage medium that is insertable into, and removable from, the disk drive 10, and has a storage capacity of 25 gigabytes, for example. FIG. 3 shows an arrangement of functional blocks in a disk drive 10 according to a preferred embodiment of the present invention. The disk drive 10 includes an optical pickup 20, a system controller 30, a signal processor 40, a disk controller 50, a driver circuit 60 and a playback processor circuit 70.

The optical pickup 20 radiates a laser beam toward the information storage layer L of the disk 1 loaded. Also, in response to a voltage signal (drive signal) supplied from the driver circuit 60, the optical pickup 20 adjusts the position of the optical system. Furthermore, the optical pickup 20 receives a laser beam, which has been reflected from the disk 1, at predetermined photosensitive areas, thereby outputting a signal representing the intensities of the light that has been received at those photosensitive areas (which will be referred to herein as a "light amount signal").

The optical pickup 20 will be described in further detail. Specifically, the optical pickup 20 includes a laser light source 21, an actuator 22, an objective lens 23 and a photodetecting section 24.

The laser light source 21 radiates a violet laser beam with a wavelength of 405 nm, for example. However, the wavelength does not have to match this value perfectly but may fall within either the range of 400 nm to 415 nm or the range of 400 nm to 430 nm. More preferably, the wavelength falls within the range of 405±5 nm.

In response to a voltage signal applied, the actuator 22 of the optical pickup 20 moves perpendicularly to the disk 1. The actuator 22 is coupled to the objective lens 23. That is why as the actuator 22 moves, the positions of the objective lens 23 can be changed. The objective lens 23 is an optical system for forming a focal point by converging the laser beam that has been radiated from the laser light source 21. By changing the positions of the objective lens 23 using the actuator 22, the focal point of the light can be located right on the information storage layer L of the disk 1. The photodetecting section 24 has a plurality of photosensitive areas, each of which outputs a photocurrent signal representing the amount of the light received.

The system controller 30 is a computer for controlling the overall operation of the disk drive 10. By reading out a computer program from a program ROM (not shown) and executing it, the system controller 30 instructs various circuits of the signal processor 40 (to be described later) to perform the intended processing.

In FIG. 3, instruction transmission lines are indicated by the dashed lines, while data signal (e.g., control signal) transmission lines by the solid lines. For example, the dashed line drawn from the system controller 30 to another circuit indicates where the instruction a given by the system controller 30 travels. In this description, any circuit that has been given an instruction is supposed to carry out the processing in accordance with that instruction. Some circuits perform the processing by using data that has been received as the data signal. The output of a sensor (not shown) that senses the insertion of the disk 1 and the output of an eject button (not shown) that gives an instruction to unload the disk 1 are connected to the system controller 30.

The signal processor 40 generates and outputs a focus error (FE) signal b and a reflected light amount signal based on the light amount signal that has been supplied from the optical pickup 20. The signal processor 40 includes an FE signal generating circuit 41 and a light amount detecting circuit 42. The FE signal generating circuit 41 generates and outputs the FE signal b. The level of the FE signal b represents the magnitude of shift between the focal point of the laser beam and the information storage layer L of the disk 1 as measured perpendicularly to the disk 1. The light amount detecting circuit 42 performs low-pass filtering on the photocurrent signal to extract and output the light amount signal c falling within a frequency range that is equal to or lower than a predetermined frequency. The photocurrent signal may represent the sum of the signals that have been supplied from the respective photosensitive areas of the photodetecting section 24, for example. The signal level of the photocurrent signal is proportional to the amount of the light received.

Optionally, the signal processor 40 may further include a tracking error (TE) signal generating circuit (not shown). The TE signal represents the magnitude of shift between the focal point of the laser beam and a target track on the disk 1 as measured in the radial direction of the disk 1. The TE signal is also needed to read desired data from the disk 1. However, the TE signal is not an essential element for the processing of the present invention and a further description thereof will be omitted herein.

The disk controller 50 outputs a signal that realizes a main control operation on the disk drive 10. For example, the disk controller 50 generates a focus control signal in response to the output signal of the FE signal generating circuit 41 and controls the focal point of the light based on the focus control signal. Also, when the disk 1 is being loaded or unloaded, the disk controller 50 generates a retraction signal for retracting the objective lens 23 at a predetermined velocity. Furthermore, the disk controller 50 generates a velocity control signal for moving the objective lens 23 at a predetermined velocity from the retraction position of the objective lens 23 retracted to a position where data can be read from the information storage layer L. Also, if the disk controller 50 has sensed that the focal point has suddenly shifted from the information storage layer L, then the disk controller 50 generates a retraction signal to retract the objective lens 23.

Next, the disk controller 50 will be described in further detail. The disk controller 50 includes a monitoring circuit 51, a retraction control section 52, a velocity control section 53, a focus control circuit 54 and a switching circuit 55.

The monitoring circuit 51 monitors the signal level of the output signal c of the light amount detecting circuit 42 while the focus control is being carried out. When finding the signal level equal to or lower than a predetermined value Clv1, the monitoring circuit 51 notifies the retraction control section 52 of that and instructs the switching circuit 55 to select the retraction signal supplied from the retraction control section 52. In this preferred embodiment, when finding the signal level equal to or lower than the predetermined value Clv1, the monitoring circuit 51 determines that the focal point of the light is no longer located on the information storage layer L, i.e., the focus control is no longer working.

In accordance with the instruction given by the system controller 30 and in response to the notification given by the monitoring circuit 51, the retraction control section 52 generates and outputs the retraction signal for retracting the objective lens 23. While the retraction signal is being supplied to the driver circuit 60, it is determined by the signal level of the retraction signal how much (or to which position) the objective lens 23 should be moved. When a final value is given as the signal level of the retraction signal, the objective lens 23 moves to the far end of its movable range, which is most distant from the disk 1, thus finishing the retraction operation. As used herein, the "far end" is the lowest point of the movable range of the objective lens 23, where the actuator 22 physically contacts with another member of the optical pickup 20. However, since the objective lens 23 does not contact with any other member at the end, the objective lens 23 never gets scratched.

The velocity control section 53 outputs a velocity control signal that changes the moving velocities of the objective lens 23 according to its position. The retraction signal and the velocity control signal are used to control the position of the objective lens 23 by moving it. That is why these retraction and velocity control signals will sometimes be referred to herein as "position control signals" collectively. Likewise, both the retraction control section 52 and the velocity control section 53 output signals for controlling the focus position. For that reason, the functions of the retraction control section 52 and the velocity control section 53 may be implemented as a single chip circuit (which will be referred to herein as a "position control circuit 56").

The focus control circuit 54 generates a focus control signal based on the FE signal b that has been supplied from the FE signal generating circuit 41. The focus control signal is used to keep the focal point of the light located on the information storage layer L continuously and is needed when data is read from the disk 1. Also, when a focus control is ready to start in response to the focus control signal, the focus control circuit 54 instructs the switching circuit 55 to select the focus control signal that has been generated by the focus control circuit 54 itself.

The switching circuit 55 selectively outputs one of multiple input signals to the driver circuit 60. For example, on receiving the focus control signal and an instruction to output it from the focus control circuit 54, the switching circuit 55 outputs the focus control signal. Alternatively, when receiving the retraction signal from the retraction control section 52 and an instruction to output the retraction signal from the system controller 30 or the monitoring circuit 51, respectively, the switching circuit 55 outputs the retraction signal. Furthermore, on receiving the velocity control signal from the velocity control section 53 and an instruction to output the velocity control signal from the system controller 30, respectively, the switching circuit 55 outputs the velocity control signal.

In response to the drive control signal supplied from the disk controller 50, the driver circuit 60 generates a voltage signal (as a drive signal) and applies it to the actuator 22 of the optical pickup 20.

The playback processor circuit 70 performs error correction and other processes on the photocurrent signal that has been supplied from the photodetecting section 24 of the optical pickup 20, thereby outputting the data that has been stored on the disk 1 as video and audio information to an external device.

Hereinafter, it will be described with reference to FIG. 4 how the disk drive 10 operates. FIG. 4 shows how the waveforms of various signals in the disk drive 10 and the positions of the objective lens change with time after the disk 1 has been loaded. As shown in portion (a) of FIG. 4, the disk is supposed to start being loaded at a time t0, which is followed by the times t1, t2, . . . and t5. The operation of the disk drive 10 will be described sequentially with reference to these times. Portions (b), (c), (d) and (e) of FIG. 4 respectively show the FE signal b, light amount signal c, control state signal d and drive control signal e, which are all shown in FIG. 3. Portion (f) of FIG. 4 shows the positions of the objective lens that change with the signal level of the drive control signal e. That is to say, when the drive control signal shown in portion (e) of FIG. 4 is input to the driver circuit 60, the objective lens 23 moves to the position shown in portion (f) of FIG. 4. The level of the information storage layer L is also shown in portion (f) of FIG. 4 for reference.

In the following description, the drive control signal shown in portion (e) of FIG. 4 is supposed to be supplied to the driver circuit 60. Alternatively, this drive control signal may be regarded as the voltage signal (i.e., drive signal) applied to the actuator 22. The reason is as follows. Specifically, the driver circuit 60 has the function of outputting a voltage signal that changes its levels according to that of the drive control signal. Also, even though those signals have different unit levels, their waveforms and the associated positions of the objective lens 23 (as shown in portion (f) of FIG. 4) change as will be described later. On top of that, portion (f) of FIG. 4 may be regarded as showing the position of the actuator 22. This is because the actuator 22 and the objective lens 23 are coupled together, and therefore, may be regarded as being located at substantially the same position perpendicularly to the disk 1.

At the time t0 when the disk starts being loaded, the user puts the disk 1 on the disk tray (not shown) of the disk drive 10 and starts to get the disk 1 loaded into the disk drive 10. More specifically, the system controller 30 drives the motor in response to the output of a sensor (not shown) that has sensed the insertion of the disk 1, thereby getting the disk tray pulled in. That is why the system controller 30 can easily know the loading start time t0. Optionally, the disk 1 may also be loaded by inserting the disk 1 directly through a disk slot without using any disk tray. Even so, the same processing is carried out. This is because the sensor also senses insertion of the disk 1 and the disk 1 is also loaded by driving the motor in that case, too.

At the time t0, the system controller 30 gives the retraction control section 52 an instruction to retract the objective lens 23. In accordance with the retraction instruction, the retraction control section 52 generates a retraction signal. Following the instruction given by the system controller 30, the switching circuit 55 continues to output the retraction signal that has been generated by the retraction control section 52 from the time t0 through the time t3. This retraction signal corresponds to the first portion of the drive control signal shown in portion (e) of FIG. 4 and labeled as "retraction signal".

Following operations are performed in response to the retraction signal. Specifically, first, the retraction signal rises to a signal level Elvl1, which is associated with a position of the objective lens 23 that is closer to the disk 1 than the farthest position thereof is. In response to the retraction signal with the signal level Elvl1, the objective lens 23 moves quickly to a position, from which the information storage layer L is located at a distance Lv1. Such a position will be referred to herein as a "position Lv1". Once the objective lens 23 reaches the position Lv1, the retraction signal gradually falls to a signal level Elvl2. As a result, the objective lens 23 falls down to a retraction position Lv2, which corresponds to the "farthest position" described above. When the objective lens 23 reaches this position, the retraction is complete at the time t1. Since the objective lens 23 is fixed at this retraction position after that, the signal level of the retraction signal is maintained at Elvl2.

At the time t2, the disk 1 gets loaded into the disk drive 10 successfully. When it is confirmed that the disk 1 has been loaded, the system controller 30 issues a "focus control ON" instruction at the time t3.

In accordance with the focus control ON instruction, the velocity control section 53 outputs a velocity control signal. Following the instruction given by the system controller 30, the switching circuit 55 starts outputting the velocity control signal that has been generated by the velocity control section 53 at the time t3. This velocity control signal corresponds to the second portion of the drive control signal shown in portion (e) of FIG. 4, which is labeled as a "velocity control signal". It should be noted that the laser light source 21 of the optical pickup 20 starts radiating a laser beam at this point in time.

Following operations are performed in response to the velocity control signal. Specifically, first, the velocity control signal rises from the signal level Elvl2 to a signal level Elvl3 at a relatively high rate of change (as represented by the gradient of the graph shown in portion (e) of FIG. 4) As a result, the objective lens 23 starts to move rather quickly from the retraction position (Lv2) toward the disk 1. Once the signal level reaches Elvl3 (i.e., once the objective lens 23 reaches the position Lv3), the velocity control signal starts to increase its level at a slower rate of change. Accordingly, the objective lens 23 starts to move at a lower velocity.

It should be noted that if some tolerance has been set for the flutter of the disk 1, for example, then the position Lv3 could be determined according to that tolerance value. As used herein, the "flutter" is defined as a deviation with respect to a reference plane (e.g., the clamped plane at the intermediate level of the disk 1). If the flutter has a tolerance of ±0.3 mm, for example, then the position Lv3 may be defined by adding 0.3 mm to the depth of the position of the objective lens, which is transmitting the laser beam being in focus with the information storage layer L, as measured from the information storage layer L. The tolerance of the flutter does not have to be ±0.3 mm but may also be set to ±0.5 mm, for example. The flutter may be measured separately in any radial direction on the disk 1.

As the level of the velocity control signal rises, the objective lens 23 moves toward to the disk 1 and the focal point of the light also gets closer to the information storage layer L little by little. Then, the level of the light amount signal c generated by the light amount detecting circuit 42 starts to increase gradually as shown in portion (c) of FIG. 4. Thereafter, when the FE signal shown in portion (b) of FIG. 4 crosses the zero level at the time t4, the focus control circuit 54 determines that a focus controllable state has been established at the current focus position. Then, the focus control circuit 54 sends the focus control signal and an instruction to output it to the switching circuit 55. In accordance with this output instruction, the switching circuit 55 switches its output signals into the focus control signal. This signal is associated with the third portion of the drive control signal shown in portion (e) of FIG. 4, which is labeled as a "focus control signal".

In this preferred embodiment, the gradient of the velocity control signal is changed in two steps such that the objective lens 23 moves relatively quickly toward the disk 1 at the beginning but moves relatively slowly once the objective lens 23 has reached the position Lv3. As a result, when the objective lens 23 is moved to a focus controllable position, the focal point of the light can be controlled so as not to go beyond the information storage layer L. Consequently, the focal point can be shifted to the focus controllable range just as intended. In addition, since the objective lens 23 is moved relatively slowly toward the disk 1 once passed the position Lv3, the objective lens 23 can be stopped without fail. As a result, the collision between the disk 1 and the objective lens 23 can be avoided appropriately.

After that, the output of the focus control circuit 54 is supplied to the driver circuit 60 by way of the switching circuit 55 and the focus control signal is input to the actuator 22. In this manner, the position of the objective lens 23 is controlled to realize a focus control. Since the focus control has not been started until the time t4, such a state will be referred to herein as a "non-controlled state". On the other hand, since the focus control is performed from the time t4 on, such a state will be referred to herein as a "controlled state". The control state signal d shown in portion (d) of FIG. 4 shows, by its signal level, whether or not the focus control is being performed. That is to say, the control state signal d rises from Low level representing the non-controlled state to High level representing the controlled state at the time t4. From the time t4 on, data can be read from the information storage layer L of the disk 1 with the focus control continued. The playback processor circuit 70 acquires and outputs data in response to the photocurrent signal supplied from the photodetecting section 24.

Next, the processing of avoiding contact between the objective lens 23 and the disk 1 during the focus control will be described. Suppose some disturbance such as impact has been caused during the focus control. Such a disturbance corresponds to a vibration applied to a portable disk drive that is playing back video, for example. When a disturbance is created, the objective lens 23 may come very close to the disk 1. In the worst-case scenario, the objective lens 23 collides against the disk 1, thus getting both of them scratched. For that reason, the process of avoiding their contact needs to be carried out during the focus control, too.

When the objective lens 23 comes very close to the disk 1 due to such a disturbance, the waveform of the FE signal b is disturbed. Portion (b) of FIG. 4 shows the waveform of the FE signal that is disturbed just before the time t5. It can be seen that the FE signal has increased amplitude and the focus error has expanded.

If the disturbance is big, then the output of the light amount detecting circuit 42 (i.e., the light amount signal) varies, too. More specifically, the greater the focus error, the smaller the amount of the reflected and detected light as a whole and the lower the level of the light amount signal. Portion (c) of FIG. 4 shows the waveform of the light amount signal that is disturbed just before the time t5 like the FE signal.

Suppose the level of the light amount signal has become lower than a predetermined reference value Clv1, which is preset in the monitoring circuit 51. On sensing that the output of the light amount detecting circuit 42 has becomes smaller than the reference value Clv1, the monitoring circuit 51 determines that the focus control is no longer working. Then, the monitoring circuit 51 notifies the retraction control section 52 of that. In response to this notification, the retraction control section 52 starts generating and outputting a retraction signal. Meanwhile, the monitoring circuit 51 instructs the switching circuit 55 to selectively output the retraction signal supplied from the retraction control section 52.

In response, the switching circuit 55 switches the focus control signal supplied from the focus control circuit 54 into the retraction signal supplied from the retraction control section 52 and sends the retraction signal to the driver circuit 60. In this case, the retraction signal varies in the same waveform as the retraction signal from the time t0 through the time t3. As a result, as in the disk loading operation, the objective lens 23 moves quickly to the position Lv1 and then moves more slowly and gradually to the retraction position Lv2, at which the actuator 22 makes physical contact with another member. After that, the objective lens 23 is fixed at that position until the system controller 30 outputs an instruction to start the focus control operation. Since the objective lens 23 goes away from the disk 1 quickly at the beginning of the retraction operation, the contact between the objective lens 23 and the disk 1 can be avoided even when the focus control is not working.

Hereinafter, the processing to be done after the disk has started being loaded and before the focus control is begun and the processing to be done when the controlled state is no longer maintained during the focus control will be described. These types of processing are carried out following the procedure shown in FIG. 5.

FIG. 5 shows the procedure of processing to be done by the disk drive 10. First, in Step S51, the system controller 30 receives an instruction to start loading a disk as the output of the sensor. In response, a retraction signal is generated in the next processing step S52, thereby retracting the objective lens 23 to the retraction position Lv2. Then, in Step S53, the system controller 30 determines whether or not the disk has been loaded successfully. If the answer is NO, the process goes back to the previous process step S52 to hold the objective lens 23 at the retraction position Lv2. On the other hand, if the answer is YES, then the process advances to Step S54, in which the retraction control section 52 and the switching circuit 55 stop outputting the retraction signal in accordance with the instruction given by the system controller 30.

Next, in Step S55, the velocity control section 53 and the switching circuit 55 apply a velocity control signal to the driver circuit 60, thereby moving the objective lens 23 to the position Lv3 relatively quickly. Subsequently, in Step S56, once reached the position Lv3, the objective lens 23 starts being moved at a slower, constant velocity.

In the next processing step S57, the focus control circuit 54 determines whether or not the focus control operation is ready to start. If the answer is YES, the process advances to Step S58. Otherwise, the process goes back to the previous processing step S56, in which the disk 1 is further brought closer to the disk 1 gradually.

In Step S58, the focus control circuit 54 outputs not only a switch instruction to the switching circuit 55 but also a focus control signal to begin a focus control. In the meantime (in the next processing step S59), the monitoring circuit 51 determines, by the level of the light amount signal, whether or not the focus controlled state is maintained (i.e., whether the focus control is still working or not). If the answer is YES, the process goes back to the previous processing step S58, in which the focus control and its monitoring are continued. But if the answer is NO, then the process advances to Step S60.

Next, in Step S60, the retraction control section 52 and switching circuit 55 output a retraction signal, thereby retracting the objective lens 23. When the retraction is done, the retraction signal with a signal level Elvl2 continues to be output in the next processing step S61 to keep the objective lens on hold at the retraction position until an instruction to resume the focus control is given.

In this process, the loss of focus control caused by some disturbance is detected. However, if the disk 1 inserted had a flutter exceeding the tolerance described above, then the focus controlled state could not be established. In that case, even if the focal point of the light came gradually closer to the disk 1, the relatively velocity of the focal point of the light with respect to the information storage layer L would be so high that the waveform of the FE signal should have an extremely short output duration. Then the objective lens 23 could not keep up with the flutter of the information storage layer L and might come so close to the disk 1 as to possibly collide against it in the end. Taking such a risk into account, if the output duration of the FE signal waveform is shorter than a preset time, then it may be determined that a non-focus-controllable disk has been inserted and the processing starting at the time t5 may be carried out swiftly. The contact between the disk 1 and the objective lens 23 can be avoided by doing so.

Next, the processing of unloading the disk 1 from the disk drive 10 will be described with reference to FIG. 6, which shows how the waveforms of various signals in the disk drive 10 and the positions of the objective lens change with time during the processing of unloading the disk 1. Portions (a) through (f) of FIG. 6 correspond to portions (a) through (f) of FIG. 4, respectively.

Suppose the eject button of the disk drive 1 is pressed at the time t10 while the disk drive 10 is performing a focus control. On receiving the output of the eject button, instructing that the disk 1 be unloaded, the system controller 30 issues an instruction to finish the focus control and sends it to the retraction control section 52 and the switching circuit 55. In accordance with this instruction, the retraction control section 52 outputs a retraction signal. Meanwhile, the switching circuit 55 switches the output signals from the focus control signal supplied from the focus control circuit into the retraction signal. In this case, the retraction signal may have the same waveform and the same signal level as those shown in portion (e) of FIG. 4 for the period of time t0 through t3. Thus, in response to this retraction signal, the driver circuit 60 drives the actuator 22, thereby moving the objective lens 23 to the position Lv1 rather quickly. After that, the driver circuit 60 gets the objective lens 23 moved slowly and gradually to the retraction position Lv2 via the actuator 22.

On seeing that the objective lens 23 still stays at the retraction position Lv2, the system controller 30 issues an instruction to unload the disk at the time t11. Then, while the objective lens 23 is still held at the retraction position (Lv2), the disk tray (not shown) is ejected out of the disk drive 10, thereby unloading the disk 1. The user removes the disk 1 from the disk tray and then the disk tray is inserted back into the disk drive 10. Then, at the time t11, the system controller 30 judges that the unloading operation has ended and instructs the retraction control section 52 and the switching circuit 55 to stop outputting the retraction signal. As a result, the driver circuit 60 stops driving the actuator 22, and the actuator 22 and the objective lens 23 coupled to the actuator 22 go back to their neutral (rest) positions.

According to this preferred embodiment, when the disk 1 starts being loaded, the retraction signal is generated to retract the actuator 22 to the position Lv2. Likewise, when the instruction to end the focus control is issued, the objective lens 23 is also retracted to, and held at, the position Lv2. Furthermore, on finding the output of the light amount detecting circuit 42 less than the predetermined value Clv1 while the focus control is being performed, the monitoring circuit 51 detects the loss of focus control and retracts the objective lens 23 to the retraction position (Lv2), too. Consequently, even when the control is no longer working, a serious collision of the objective lens 23 against the disk 1 can be avoided.

By operating the disk drive in this manner, in any of various situations where the objective lens 23 is highly likely to collide against the disk 1 (e.g., even if a vibration is produced when the disk is being loaded; even if the working distance between the disk and the objective lens is short; even if the disk has a significant flutter; or even if the actuator is changing its positions toward the disk), an proper distance can be maintained between the objective lens and the disk and their collision can be avoided just as intended. Among other things, this technique is particularly effectively applicable to a mobile device, which is easily subject to vibrations and impacts, always used in an unfixed position and therefore would often cause a serious collision between the objective lens and the disk unless some measure was taken.

By using the retraction signal of this preferred embodiment, the actuator 22 is driven at a relatively high velocity during an initial stage of the operation, thereby moving the objective lens 23 to the position Lv1 quickly. Once the objective lens 23 has reached the position Lv1, the actuator 22 is driven at a relatively low velocity to move the objective lens 23 to the retraction position Lv2 gradually. Since the objective lens 23 is retracted with the velocities changed in these two stages, the dangerous zone where the objective lens 23 easily collides against the disk can be passed quickly and the impact of the physical contact of the actuator 22 at the retraction position can be reduced so much as to minimize damage done on the actuator 22. Besides, the noise made by the disk drive can be reduced as well.

Furthermore, since the actuator 22 makes a physical contact with another member at the retraction position Lv2, the actuator 22 never produces unnecessary vibrations. Also, as the focus control operation is started at the retraction position Lv2, the actuator 22 is stabilized sufficiently and the stability of control can be increased, too.

Meanwhile, the velocity control signal generated by the velocity control section 53 causes the actuator 22 to be moved from the retraction position Lv2 to the position Lv3 at a high velocity and then driven at a lower velocity from the position Lv3 on. As a result, in the focus control operation, the zone where the objective lens is sufficiently distant from the focus-controllable position can be passed quickly and the focus controlled state can be established in a much shorter time. Besides that, when the objective lens 23 comes close to a focus controllable range, the relative velocity of the objective lens 23 to the disk 1 can be decreased to stabilize the focus control operation.

In the preferred embodiment described above, the monitoring circuit 51 monitors the focus control with only the output c of the light amount detecting circuit 42. Optionally, however, the output b of the FE signal generating circuit 41 and the output of the focus control circuit 54 may be combined as well. Also, in the preferred embodiment described above, the impact of the physical contact is reduced by making the retraction signal have a ramp waveform locally. Alternatively, the retraction signal may also have a stepped waveform or a curved waveform such as a quadratic function. Furthermore, in the preferred embodiment described above, the objective lens 23 is moved at two different velocities (i.e., relatively quickly and relatively slowly) by using the velocity control signal. Optionally, by changing the velocities either in a greater number of stages or even linearly, the unnecessary vibrations of the objective lens 23 can be minimized and the focus controlled state can be established in a much shorter time.

Also, in the preferred embodiment described above, while the disk 1 is being loaded, the objective lens is supposed to be retracted by moving the actuator 22. Alternatively, the objective lens 23 may be retracted from the disk 1 by moving the entire optical pickup 3 first and then by moving the actuator 22 alone once the disk 1 has got loaded.

The system controller 30 of this preferred embodiment can control the operation described above by executing a computer program, which may include instructions to perform the processing as defined by the flowchart shown in FIG. 5, for example. The computer program may be stored in any of various types of storage media. Examples of preferred storage media include optical storage media such as optical disks, semiconductor storage media such as SD memory cards and EEPROMs, and magnetic recording media such as flexible disks. Instead of using such a storage medium, the computer program may also be downloaded via a telecommunications line (over the Internet, for example) and installed in the disk drive 10.

The disk controller 50 may be circulated by itself either as a single semiconductor chip such as a digital signal processor (DSP) or as a circuit board on which more than one semiconductor chip has been mounted. Also, when built in an apparatus including all of the components shown in FIG. 3 except those of the disk controller 50, the disk controller 50 can make that apparatus function as the disk drive 10.

In the preferred embodiments described above, a disk-shaped disk 1 is supposed to be loaded into the disk drive 10. Alternatively, the disk drive 10 may also be loaded with an optically readable card as well. In this description, it has been described how the disk drive 10 reads data from a Blu-ray disc 1. Optionally, the disk drive 10 may also have the function of writing data on the Blu-ray disc 1 and may perform a write operation thereon, too.

INDUSTRIAL APPLICABILITY

The disk drive of the present invention can be used effectively as an optical disk drive that sets the NA of its optical system high enough, and its working distance short enough, to realize high-density recording, and may be easily built in a video recorder, for example. The disk drive of the present invention can also be used effectively as an optical disk drive for a mobile device that is easily subject to impact and vibrations and can find applications in video movies, too.

The invention claimed is:

1. An information processing apparatus comprising:
   a light source;
   a converging section for converging light that has been emitted from the light source;
   a shifting section for shifting the focal point of the light by changing the positions of the converging section perpendicularly to an information storage layer of a storage medium in accordance with a drive signal;
   a photodetecting section for receiving the light that has been reflected from the information storage layer to generate a light amount signal;
   a position control section for generating a position control signal to change the positions of the converging section at variable velocities depending on where the converging section is located;
   a focus control section for generating a focus control signal based on the light amount signal such that the focal point of the light is located within a focus controllable range with respect to the information storage layer;
   a switching section for selectively outputting either the position control signal or the focus control signal; and
   a driving section for outputting a drive signal in response to the output signal of the switching section,
   wherein the switching section outputs the position control signal to shift the focal point of the light to the focus controllable range and then outputs the focus control signal.

2. The information processing apparatus of claim 1, wherein while the storage medium is being loaded, the position control section generates a retraction signal that changes the positions of the converging section away from the storage medium in multiple steps.

3. The information processing apparatus of claim 2, wherein the position control section changes the positions of the converging section at a first velocity initially and then at a second velocity, which is lower than the first velocity, once the converging section has reached a first position.

4. The information processing apparatus of claim 1, wherein while the storage medium is being loaded, the position control section generates a position control signal that changes the positions of the converging section toward the storage medium in multiple steps.

5. The information processing apparatus of claim 4, wherein the position control section changes the positions of the converging section at a third velocity initially and then at a fourth velocity, which is lower than the third velocity, once the converging section has reached a second position.

6. The information processing apparatus of claim 5, wherein the focus control section determines, by the light amount signal, whether or not the focal point of the light has entered the focus controllable range and generates a switch instruction when the focal point enters the range, and
   wherein in accordance with the switch instruction, the switching section changes its output signals from the position control signal into the focus control signal.

7. The information processing apparatus of claim 6, further comprising a monitoring section for determining, by the light amount signal, whether the focal point of the light is inside or outside the focus controllable range,
   wherein if the monitoring section has sensed that the focal point has gone beyond the range while the switching section is outputting the focus control signal, then the position control section generates a retraction signal that changes the positions of the converging section away from the storage medium in multiple steps.

8. A disk controller to be built in a disk drive that operable to read and/or write data from/on a disk,
   the disk drive comprising: a light source; a converging section for converging light that has been emitted from the light source; a shifting section for shifting the focal point of the light by changing the positions of the converging section perpendicularly to an information storage layer of a storage medium in accordance with a drive signal; a photodetecting section for receiving the light that has been reflected from the information storage layer to generate a light amount signal; and a driving section for outputting a drive signal in response to a drive control signal,
   wherein the disk controller comprises:
   a position control section for generating a position control signal to change the positions of the converging section at variable velocities depending on where the converging section is located;
   a focus control section for generating a focus control signal based on the light amount signal such that the focal point of the light is located within a focus controllable range with respect to the information storage layer; and
   a switching section for selectively outputting either the position control signal or the focus control signal as the drive control signal, the switching section outputting the position control signal to shift the focal point of the light to the focus controllable range and then outputting the focus control signal.

9. An information processing method comprising the steps of:
   converging light that has been emitted from a light source using an optical system;

shifting the focal point of the light by moving the converging position of the light perpendicularly to an information storage layer of a storage medium in accordance with a drive signal;

receiving the light that has been reflected from the information storage layer to generate a light amount signal;

generating a position control signal to change the positions of the optical system at variable velocities depending on where the optical system is located;

generating a focus control signal based on the light amount signal such that the focal point of the light is located within a focus controllable range with respect to the information storage layer;

selectively outputting either the position control signal or the focus control signal; and generating a drive signal based on the signal that has been output in the step of selectively outputting, wherein the step of selectively outputting includes outputting the position control signal to shift the focal point of the light to the focus controllable range and then outputting the focus control signal.

* * * * *